United States Patent
Chen et al.

(10) Patent No.: US 11,036,634 B2
(45) Date of Patent: Jun. 15, 2021

(54) APPARATUS, SYSTEM, AND METHOD TO FLUSH MODIFIED DATA FROM A VOLATILE MEMORY TO A PERSISTENT SECOND MEMORY

(71) Applicant: INTEL CORPORATION, Santa Clara, CA (US)

(72) Inventors: Wei Chen, Portland, OR (US); Rajat Agarwal, Beaverton, OR (US); Jing Ling, Milpitas, CA (US); Daniel W. Liu, San Rafael, CA (US)

(73) Assignee: Intel Corporation, Santa Clara, CA (US)

( * ) Notice: Subject to any disclaimer, the term of this patent is extended or adjusted under 35 U.S.C. 154(b) by 27 days.

(21) Appl. No.: 16/258,486

(22) Filed: Jan. 25, 2019

(65) Prior Publication Data
US 2019/0171568 A1 Jun. 6, 2019

Related U.S. Application Data

(63) Continuation of application No. 15/465,513, filed on Mar. 21, 2017, now Pat. No. 10,198,354.

(51) Int. Cl.
*G06F 12/0808* (2016.01)
*G06F 12/0866* (2016.01)
(Continued)

(52) U.S. Cl.
CPC ........ *G06F 12/0808* (2013.01); *G06F 1/3287* (2013.01); *G06F 3/0685* (2013.01);
(Continued)

(58) Field of Classification Search
CPC .. G06F 12/0808; G06F 1/3287; G06F 3/0685; G06F 12/0638; G06F 12/0811;
(Continued)

(56) References Cited

U.S. PATENT DOCUMENTS

| 8,612,676 B2 | 12/2013 | Dahlen et al. |
| 8,930,647 B1 | 1/2015 | Smith |

(Continued)

FOREIGN PATENT DOCUMENTS

| WO | 2013095437 | 6/2013 |
| WO | 2016/099567 | 6/2016 |

OTHER PUBLICATIONS

"CLFLUSH: Flush Cache Line (x86 Instruction Set Reference)", [online], [Retrieved on Jan. 28, 2017], Retrieved from the Internet at <URL: http://x86.renejeschke.de/html/file_module_x86_id_30.html>, 1 pg.

(Continued)

*Primary Examiner* — Francisco A Grullon
(74) *Attorney, Agent, or Firm* — Compass IP Law PC

(57) ABSTRACT

Provided are an apparatus, system, and method to flush modified data from a first memory to a persistent second memory. A first memory controller coupled to the first memory includes at least one RAS controller to read a range of addresses in the first memory. In response to receiving a command from the power control unit, the at least one RAS controller is invoked to read data from at least one range of addresses specified for the RAS controller from the first memory. A second memory controller transfers data read from the first memory determined to be modified to the second memory. The first memory controller sends a signal to the power control unit to indicate that the modified data in the range of addresses specified for the RAS controller was flushed to the second memory in response to the RAS controller completing reading the range of addresses.

24 Claims, 5 Drawing Sheets

(51) Int. Cl.
  *G06F 1/3287* (2019.01)
  *G06F 3/06* (2006.01)
  *G06F 12/06* (2006.01)
  *G06F 12/0811* (2016.01)
  *G06F 12/0868* (2016.01)
  *G06F 12/128* (2016.01)
  *G06F 12/12* (2016.01)

(52) U.S. Cl.
  CPC ...... *G06F 12/0638* (2013.01); *G06F 12/0811* (2013.01); *G06F 12/0866* (2013.01); *G06F 12/0868* (2013.01); *G06F 12/128* (2013.01); *G06F 12/12* (2013.01); *G06F 2212/205* (2013.01); *G06F 2212/283* (2013.01); *G06F 2212/621* (2013.01); *G06F 2212/70* (2013.01)

(58) Field of Classification Search
  CPC ............ G06F 12/0868; G06F 12/128; G06F 12/0866; G06F 2212/70; G06F 12/12; G06F 2212/205; G06F 2212/283; G06F 2212/621; G06F 12/0806; G06F 13/28
  See application file for complete search history.

(56) References Cited

U.S. PATENT DOCUMENTS

| | | | |
|---|---|---|---|
| 9,269,436 B2 | 2/2016 | Mandava et al. | |
| 9,792,190 B2* | 10/2017 | Kumar | G06F 11/00 |
| 2006/0136765 A1* | 6/2006 | Poisner | G06F 11/1441 |
| | | | 713/323 |
| 2007/0033431 A1* | 2/2007 | Pecone | G06F 11/3058 |
| | | | 714/6.12 |
| 2014/0032844 A1 | 1/2014 | Avudaiyappan et al. | |
| 2014/0297919 A1* | 10/2014 | Nachimuthu | G11C 14/009 |
| | | | 711/102 |
| 2014/0304475 A1 | 10/2014 | Ramanujan et al. | |
| 2015/0143174 A1* | 5/2015 | Adler | G06F 12/0246 |
| | | | 714/20 |
| 2015/0278005 A1* | 10/2015 | Cordero | G06F 11/1044 |
| | | | 714/6.12 |
| 2016/0378623 A1* | 12/2016 | Kumar | G06F 11/00 |
| | | | 714/3 |
| 2017/0168890 A1* | 6/2017 | Marripudi | G06F 3/0619 |
| 2017/0192888 A1 | 7/2017 | Moon et al. | |
| 2017/0329706 A1 | 11/2017 | Nemawarkar et al. | |
| 2017/0357604 A1 | 12/2017 | Lim et al. | |
| 2018/0276124 A1* | 9/2018 | Chen | G06F 12/0811 |

OTHER PUBLICATIONS

"WBINVD—Write Back and Invalidate Cache", [online], [Retrieved on Jan. 28, 2017], Retrieved from the Internet at <URL: http://www.felixcloutier.com/x86/WBINVD.html>, 2 pp.

European Search Report for EP Application No. 18155593, dated Jul. 27, 2018, 9 pp.

Office Action 1 for U.S. Appl. No. 15/465,513, dated Apr. 25, 2018, 14 pp.

Response to Office Action 1 for U.S. Appl. No. 15/465,513, dated Jul. 25, 2018, 19 pp.

Notice of Allowance 1 for U.S. Appl. No. 15/465,513, dated Sep. 19, 2018, 8 pp.

Response to Examination Report for EP Application No. 18155593, dated Sep. 17, 2020, 10 pp.

Examination Report for EP Application No. 18155593, dated Jul. 9, 2020, 5 pp.

* cited by examiner

RAS Controller Address Range

APPARATUS, SYSTEM, AND METHOD TO FLUSH MODIFIED DATA FROM A VOLATILE MEMORY TO A PERSISTENT SECOND MEMORY

TECHNICAL FIELD

Embodiments described herein generally relate to an apparatus, system, and method to flush modified data from a volatile memory to a persistent second memory.

BACKGROUND

In a typical computer system, an operating system or application can either access the system memory directly or through a faster, but smaller cache. The cache memory normally uses a different memory technology and has much better performance characteristics. In this cached hierarchy, cache is not visible to software and is completely handled by the hardware for data movements between the cache and the main system memory. The cache is sometimes referred to as the first level memory and the main system memory as the second level memory.

BRIEF DESCRIPTION OF THE DRAWINGS

Embodiments are described by way of example, with reference to the accompanying drawings, which are not drawn to scale, in which like reference numerals refer to similar elements.

DESCRIPTION OF EMBODIMENTS

Figure 1:
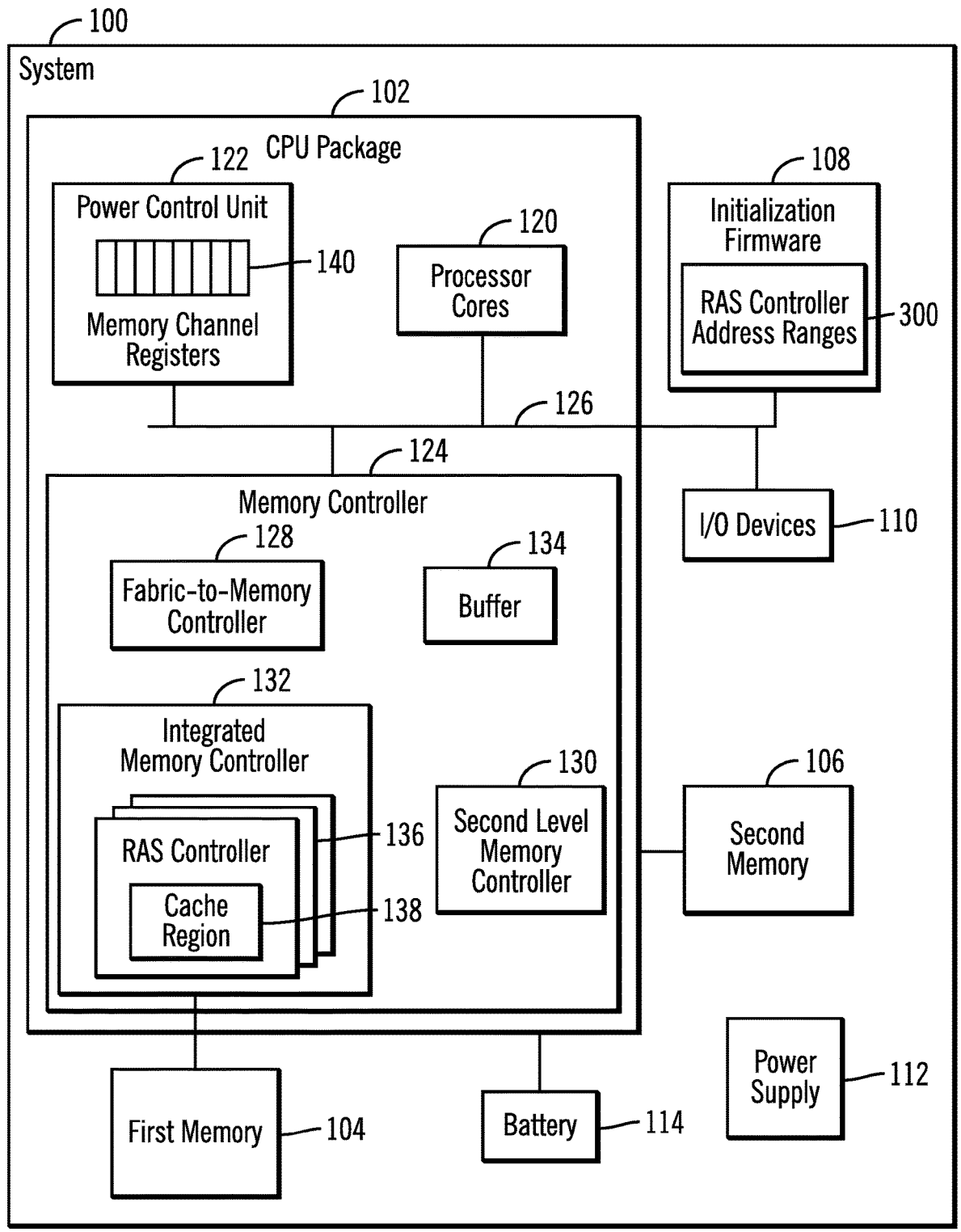
FIG. 1 illustrates an embodiment of a system including a memory controller and first and second level memories.

In an application direct access mode, applications may directly write data to the persistent non-volatile memory or storage, and data for this persistent non-volatile memory may be cached in a first level memory device, such as a volatile memory. To flush modified data in the first level memory device to the persistent second level memory, the host operating system may issue commands to the memory locations in the first level memory device to write modified or dirty data cached in the first level memory 15 device to the persistent second level memory device. The operating system is exposed to address spaces of the persistent second level memory device but does not directly access the data from the persistent second level memory. Instead, the operating system would access data from the persistent second level memory in the first level cache memory device, and hardware manages the transport of data between the first level and 20 the second level memory devices.

There is a need in the art for improved techniques for managing a first level memory and second level memory to improve system performance.

Described embodiments provide techniques to flush data from a first level memory or cache to persistent storage before performing a shutdown or other power down sequence. Certain systems have the operating system read modified data from the first level memory to write out to the persistent storage, which can require significant processing resources and power. During a system failure, components may run on battery power to flush the memory, and the processor resources needed to read the dirty data from the first level memory or cache and writing out the data to the persistent storage can be time and power consuming.

Described embodiments perform the reading of the first level memory to flush modified data within the memory controller to transfer to the persistent storage. Using the memory controller utilizes less power than the processor cores reading and writing out modified data, which conserves battery power to allow for a full shutdown sequence in the event of a power loss event. Implementing the flushing in the memory controller reduces the time and power consumption of the flushing operations by utilizing existing hardware design and flows that are otherwise used for normal functionalities during normal memory controller operations.

In the following description, numerous specific details such as logic implementations, opcodes, means to specify operands, resource partitioning/sharing/duplication implementations, types and interrelationships of system components, and logic partitioning/integration choices are set forth in order to provide a more thorough understanding of the present invention. It will be appreciated, however, by one skilled in the art that the invention may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Certain embodiments relate to storage device electronic assemblies. Embodiments include both devices and methods for forming electronic assemblies.

FIG. 1 illustrates an embodiment of a system 100 including a Central Processing Unit (CPU) package 102, a first memory 104, a second memory 106, initialization firmware 108, e.g., a Basic Input Operating System (BIOS), to manage system initialization of the hardware components, Input/Output (I/O) devices 110, such as input controls (e.g., keyboards, mice, touch screen), display monitors, storage devices, etc.; a power supply 112 to supply power to the components of the system 100, and a battery 114 to supply power to the components in the CPU package 102 in the event power from the power supply 112 is interrupted.

The CPU package 102, comprised of one or more integrated circuit dies, may include processor cores 120, a power control unit 122 to manage power related and shut down operations, and a memory controller 124 to manage access to the first memory 104 and the second memory 106. The memory controller 124 may manage the first memory 104 as a cache for the second memory 106, where the first memory may comprise a smaller, faster access memory than the second memory 106. In a two level memory embodiment, the memory controller 124 manages the first memory 104 as a cache, which may be referred to as a near memory or first level memory, to the second memory 106, which may be referred to as a far memory or second level memory, such that read and write requests from the processor cores 120 are directed directly to memory addresses in the second memory 106, and cached in the first memory 104 for faster access. A bus interface 126 comprising one or more bus interfaces may provide for communication among the components in the CPU package 102 and other components in the system 100, such as the initialization firmware 108 and I/O devices 110. The bus interface 126 may comprise a processor bus, fabric, ring or mesh architecture internal to the processor 120.

The memory controller 124 may include a fabric-to-memory controller 128 to manage communication with the processor cores 120 and the second memory 106; a second level memory controller 130 to process requests from the processor cores 120 and cache data for the second memory 106 in the first memory 104, and manage the transfer of data and requests to the second memory 106 through the fabric-to-memory controller 128; an integrated memory controller 132 to manage access to the first memory 104; and a buffer 134 to buffer data being transferred between the first 104 and second 106 memories and the processor cores 120. The integrated memory controller 132 may include one or more Reliability, Availability, and Service (RAS) controllers 136 to read data in the first memory 104 defined in a cache region 138 specifying one or more address ranges for each RAS controller 136. During a normal operation mode, the RAS controllers 136 continually read through the address regions in the first memory 104 defined in the cache region 138 for the RAS controller 136 to perform error correction on the read data if necessary. In certain embodiments, the RAS controllers 136 may comprise patrol scrub engines to read and correct data at memory addresses. In a persistent cache flush operation mode invoked during a power shutdown or failure, the RAS controllers 136 may read the data in their cache regions 138 in the first memory 104 to flush dirty, i.e., modified data to the second memory 106.

Figure 2:
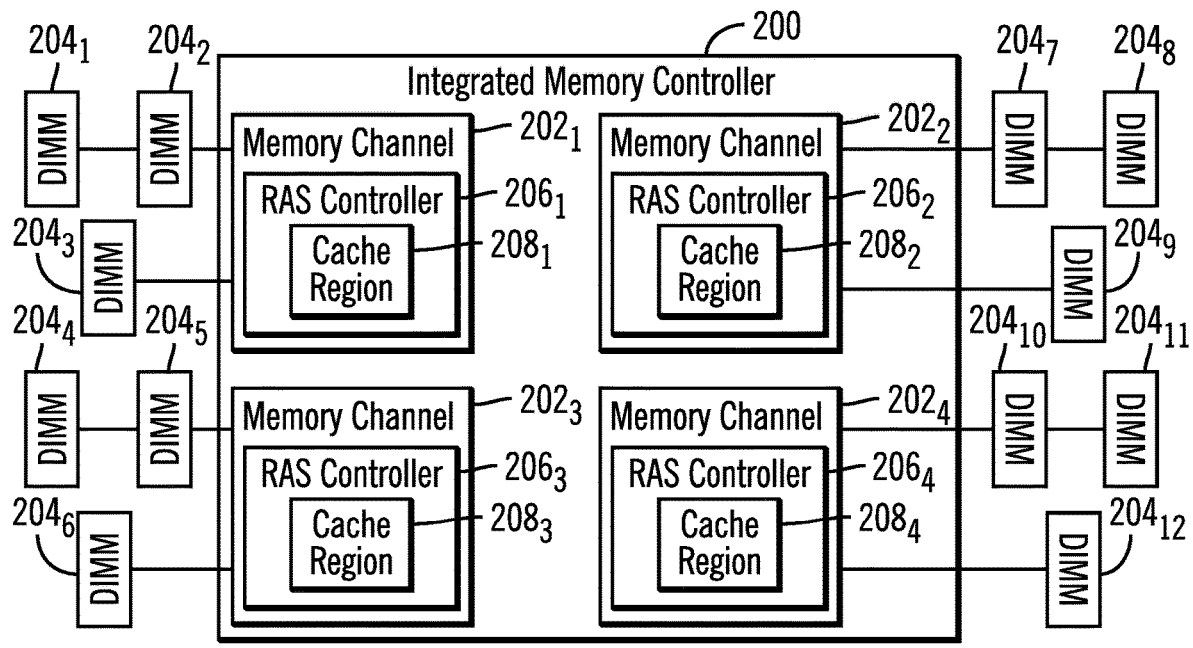
FIG. 2 illustrates an embodiment of an integrated memory controller.

The power control unit 122 maintains memory channel registers 140, such that when a RAS controller 136 flushes or reads all addresses for one or more memory channels identified in its cache region 138, the RAS controller 136 sends a message to the power control unit 122. Upon receiving a message from a RAS controller 136 or the memory controller 124, that all the addresses for one or more memory channels were read by the RAS controller 136 as part of a persistent cache flush operation, the power control unit 122 updates the memory channel register 140 corresponding to the memory channel that has been read/flushed by the RAS controller 136 to indicate that the memory channel has been flushed. There may be one register in the registers 140 for each memory channel to a memory device or memory die in the first memory 104, such as shown in FIG. 2.

The initialization firmware 108 maintains RAS controller address ranges 300 to configure the cache region 138 for each RAS controller 136 so the RAS controller 136 is configured with the address range 138 to read during refresh and flush operations.

In the embodiment of FIG. 1, the memory controller 124 is integrated in the CPU package 102. In an alternative embodiment, the memory controller 124 may be implemented in separate integrated circuit dies external to the CPU package 102. Further, the components of the memory controller 124, such as the integrated memory controller 132, second memory level controller 130, and fabric-to-memory controller 128 may be implemented in a same integrated circuit package or separate integrated circuit devices.

In one embodiment, the first memory 104 may be comprised of one or more volatile memory devices comprising requires power to maintain the state of data stored by the medium. Non-limiting examples of volatile memory may include various types of random access memory (RAM), such as Dynamic Random Access Memory (DRAM), Dual Direct In-Line Memory Modules (DIMMs), synchronous dynamic random access memory (SDRAM), etc. In particular embodiments, DRAM of a memory component may comply with a standard promulgated by JEDEC, such as JESD79F for DDR SDRAM, JESD79-2F for DDR2 SDRAM, JESD79-3F for DDR3 SDRAM, JESD79-4A for DDR4 SDRAM, JESD209 for Low Power DDR (LPDDR), JESD209-2 for LPDDR2, JESD209-3 for LPDDR3, and JESD209-4 for LPDDR4 (these standards are available at www.jedec.org). Such standards (and similar standards) may be referred to as DDR-based standards and communication interfaces of the storage devices that implement such standards may.

The second memory 106 may be comprised of a byte-addressable write in place non-volatile memory device, such as a ferroelectric random-access memory (FeTRAM), nanowire-based non-volatile memory, three-dimensional (3Dcrosspoint memory, phase change memory (PCM), memory that incorporates memristor technology, Magnetoresistive random-access memory (MRAM), Spin Transfer Torque (STT)-MRAM, SRAMstorage devices, etc. In certain embodiments, the 3D crosspoint memory may comprise a transistor-less stackable cross point architecture in which memory cells sit at the intersection of word lines and bit lines and are individually addressable and in which bit storage is based on a change in bulk resistance. In a further embodiment, the second memory 106 may comprise a block addressable non-volatile memory, such as NAND dies (e.g., single level cell (SLC), multi-level cell (MLC), triple level cell (TLC) NAND memories, etc.).

In one embodiment, the second or far memory 106 provides more data storage than the first memory 104 or near memory and the first near memory 104 provides a faster access cache for the second (far) memory 106. The second level memory controller 130 may determine whether data requested by the processor 120 is cached in the near memory 104, and if not, the second level memory controller 130 fetches the requested data from the far memory 106.

FIG. 2 illustrates an embodiment of an integrated memory controller 200, such as the integrated memory controller 132, including a plurality of memory channels $202_1$, $202_2$, $202_3$, and $202_4$ that manage access to one or more connected DIMMs $204_1$, $204_2$, $204_4$ ... $204_8$. Each memory channel $202_1$, $202_2$, $202_3$, and $202_4$ includes a RAS controller $206_1$, $206_2$, $206_3$, and $206_4$ to perform refresh and flush to the second memory 106 with respect to the addresses in the cache region $208_1$, $208_2$, $208_3$, and $208_4$ in the memory channel $202_1$, $202_2$, $202_3$, and $202_4$ with which the RAS controller $206_1$, $206_2$, $206_3$, and $206_4$ is associated.

In the embodiment of FIG. 2, there is shown one RAS controller $206_1$, $206_2$, $206_3$, and $206_4$ for each memory channel $202_1$, $202_2$, $202_3$, and $202_4$. In alternative configurations, a RAS controller $206_i$ may read addresses in DIMMs $204_i$ on multiple channels $202_i$. Further, there may be more or fewer memory channels $202_i$ than shown in FIG. 2.

Figure 3:
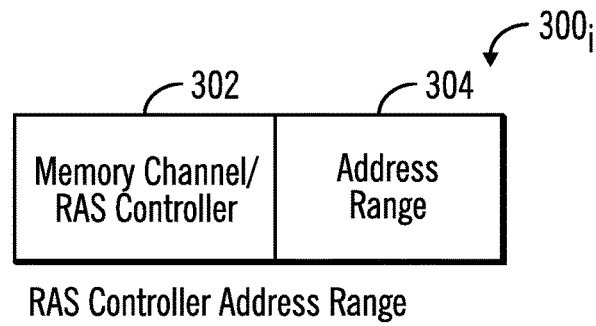
FIG. 3 illustrates an embodiment of a Reliability, Availability, and Serviceability (RAS) controller address range.

FIG. 3 illustrates an embodiment of an instance of a RAS controller address range $300_i$ in the RAS controller address ranges 300 configured in the initialization firmware 108, which includes a memory channel/RAS controller 302 and address range 304 to configure for the cache region 138, $208_i$ at the RAS controllers 136, $206_i$.

Figure 4:
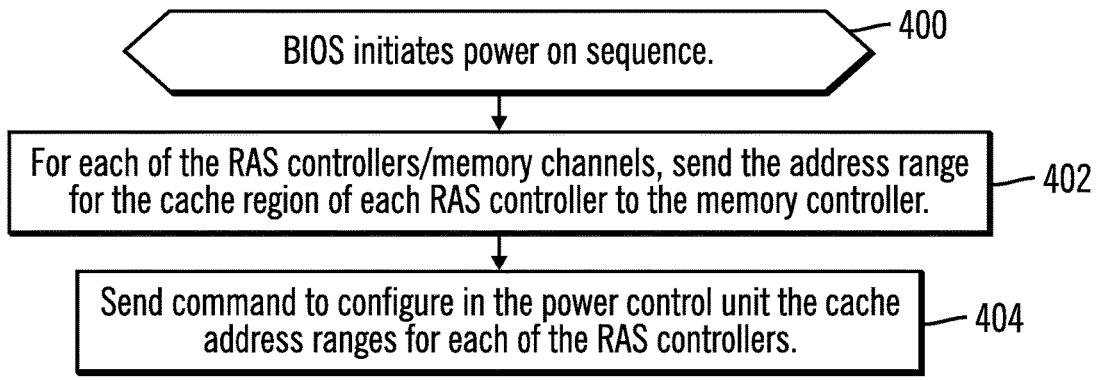
FIG. 4 illustrates an embodiment of operations to configure RAS controllers in the integrated memory controller to read address ranges.

FIG. 4 illustrates an embodiment of operations performed in the initialization firmware 108 to configure the cache regions 138, $208_i$ in the memory controller 124, 200. Upon the initialization firmware 108 initiating the power-on sequence to configure hardware components in the system 100, the initialization firmware 108 sends (at block 402) the address range 304 for each memory channel/RAS controller 302 to the memory controller 124, 200. The memory controller 124, 200 may then configure the cache address range 138, $208_i$ for the RAS controller/memory channel to which the address range 304 is directed. The initialization firmware 108 may further send (at block 404) a command to the power control unit 122 to configure the memory channel registers 140 for each of the memory channels/RAS controllers 302 for which an address range 304 is provided. In this way, the power control unit 122 and the memory controller RAS controllers 136, $206_i$ are configured to indicate the address range that each of the RAS controllers 136, $206_i$ will use to perform refresh and flush operations.

Figure 5:
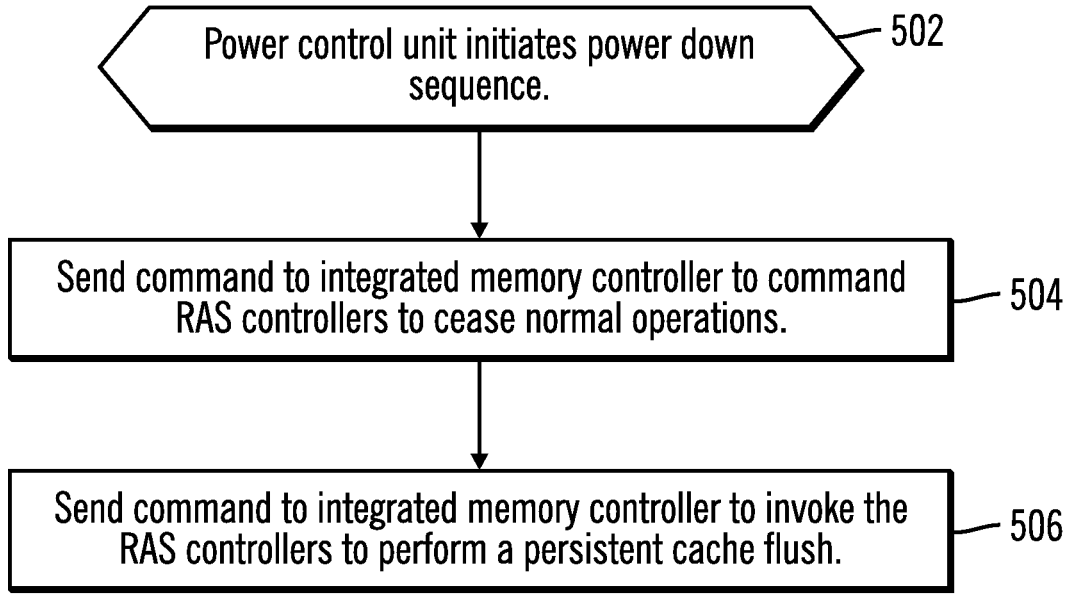
FIG. 5 illustrates an embodiment of operations by a power control unit to initiate a power down sequence and signal a memory controller.

FIG. 5 illustrates an embodiment of operations performed by the power control unit 122 to initiate a power-down sequence, such as in the event of a failure or scheduled/planned power down for maintenance or other reasons. Upon the power control unit 122 initiating (at block 502) a power down sequence, the power control unit 122 sends (at block 504) a flush command to the integrated memory controller 132 to command the RAS controllers 136, $206_i$ to cease normal operating mode. In normal operating mode, the RAS controllers 136, $206_i$ read addresses and correct data errors to refresh the first memory 104. The power control unit 122 sends (at block 506) a command to the integrated memory controller 132, 200 to invoke the RAS controllers 136, $206_i$ to perform a persistent cache flush operation, described with respect to FIG. 7.

Figure 6:
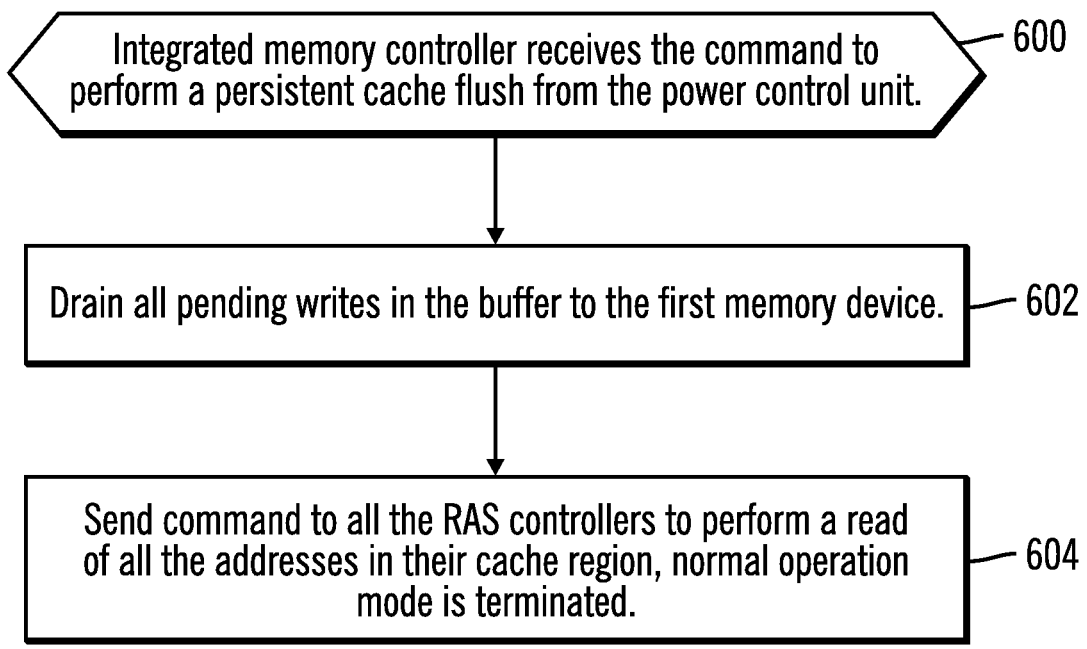
FIG. 6 illustrates an embodiment of operations to process a flush command from a power control unit.

FIG. 6 illustrates an embodiment of operations performed by the integrated memory controller 132, 200 upon receiving the persistent cache flush command from the power control unit 600. Upon receiving (at block 600) the persistent cache flush command, the memory controller 124, or some other component within the memory controller 124, drains (at block 602) any pending writes in the buffer 134 to the first memory 104 to store. After draining the buffer 134, the memory controller 124 or integrated memory controller 132 sends (at block 604) commands to all the RAS controllers 136, $206_i$ to read all the addresses in their cache region 138, $208_i$, which would occur after the normal operation mode is terminated.

Figure 7:
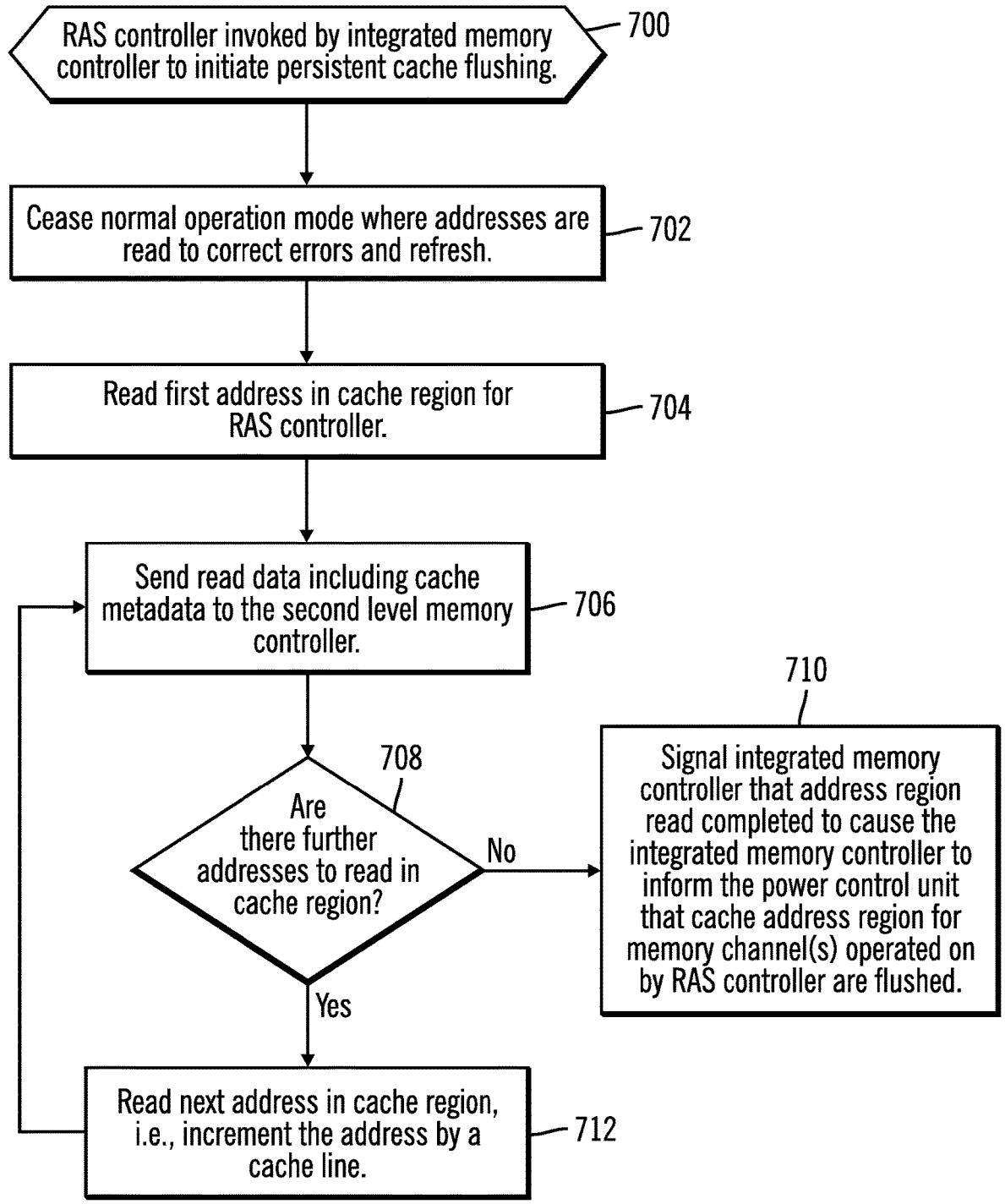
FIG. 7 illustrates an embodiment of operations performed by RAS controllers in the integrated memory controller to read addresses in a first memory.

FIG. 7 illustrates an embodiment of operations performed by each of the RAS controllers 136, $206_i$ to perform read operations as part of a persistent cache flushing operation initiated by the power control unit 122. Upon receiving (at block 700) a command, from the memory controller 124 or the power control unit 122, to initiate persistent cache flushing, the RAS controller 136, $206_i$ ceases (at block 702) normal operation mode where addresses are read to perform any error correction if needed and read back. The RAS controller 136, $206_i$ performs a read (at block 704) of the first address in the cache region 138, $208_i$ for the RAS controller 136, $206_i$ and sends (at block 706) the read data including cache metadata, such as bits indicating whether the data is dirty, e.g., modified, unmodified, etc., to the second level memory controller 130. If (at block 708) there are further addresses to read in the cache region 138, $208_i$ then the next address in the cache region in the cache region 138, $208_i$ is read (at block 712), such as by incrementing the address by a cache line, and control proceeds back to block 706 to send the read data to the second level memory controller 130. If (at block 708) there are no further addresses in the cache region 138, $208_i$ to read, then the RAS controller 136, $206_i$ signals (at block 710) the integrated memory controller 132 that the address region read completed, which causes the integrated memory controller 132, 200 or memory controller 124 to inform the power control unit 122 that the cache address region 138, $208_1$ for memory channel(s) operated on by the signaling RAS controller 136, $206_1$ are flushed.

Figure 8:
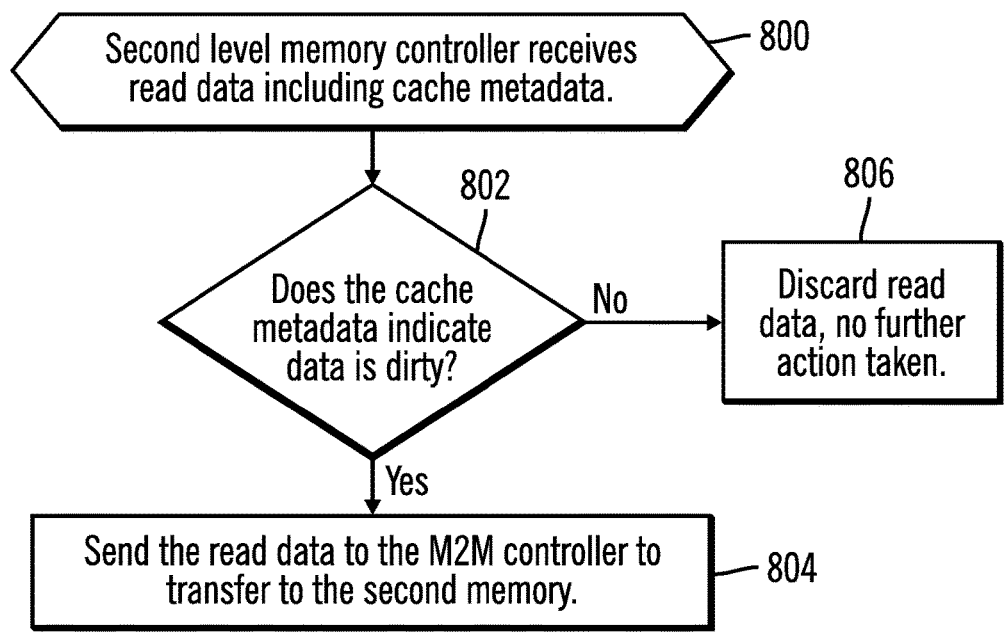
FIG. 8 illustrates an embodiment of operations performed by a second level memory controller to process data read by the RAS controllers.

FIG. 8 illustrates an embodiment of operations performed by the second level memory controller 130 in response to receiving read data from a RAS controller 136, $206_1$ including the cache metadata for the read data. If (at block 806) the cache metadata indicates the read data is dirty, e.g., modified data, then the second level memory controller 130 sends (at block 804) the read data to the fabric-to-memory controller 128 to transfer to the second memory 106. If (at block 802) the cache metadata indicates the data is not dirty or modified, then the data is discarded (at block 806) and no further action is taken with respect to that read data.

With the operations of FIG. 8, the second level memory controller 130 transfers dirty data read by the RAS controllers 136, $206_i$ to the second memory 106 to flush the modified data to the persistent second memory 106, while discarding data that is not dirty.

Figure 9:
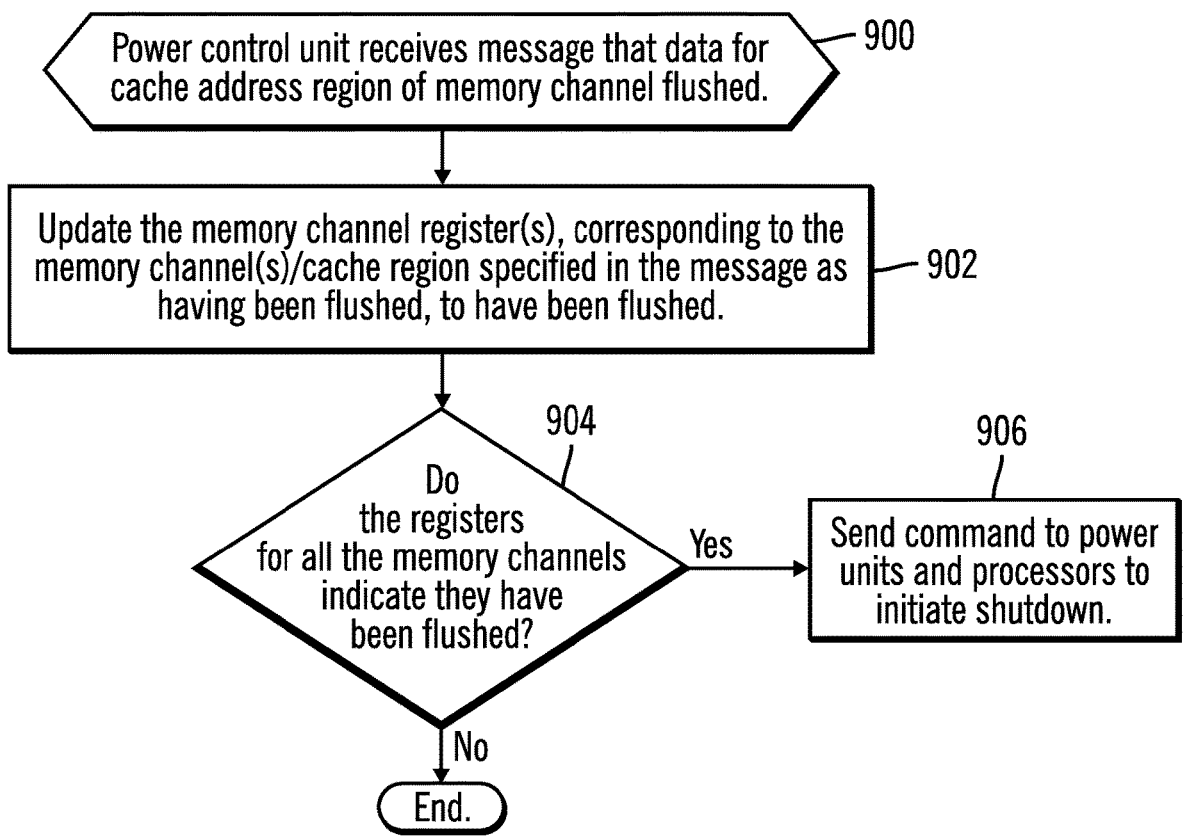
FIG. 9 illustrates an embodiment of operations performed by the power control unit to process messages from the integrated memory controller that flushing has been performed with respect to a cache address region.

FIG. 9 illustrates an embodiment of operations performed by the power control unit 122 to process a message from the integrated memory controller 132, 200 indicating that the addresses for one or more memory channels $202_1$, $202_2$, $202_3$, and $202_4$ or cache region 138, $208_i$ has been flushed. The integrated memory controller 132, 200 would send this message in response to a signal from a RAS controller 136, $206_i$ that all the addresses for the memory channel $202_i$/cache region have been read. Upon receiving (at block 900) a message indicating the memory channel $202_i$/cache region having been read, the power control unit 122 updates (at block 902) the memory channel register(s) 140 corresponding to the memory channel $202_i$/cache region indicated in the message as having been read and/or flushed, to indicate that the corresponding memory channel/cache region was flushed. If (at block 904) all the registers 140 for all the available memory channels $202_1$, $202_2$, $202_3$, and $202_4$ are indicated as having been read or flushed, then the power control unit 122 sends a command to the power units, such as power supply 112, processor cores 120, and other components to initiate a shutdown or power-down sequence.

With the operations of FIG. 9, the power control unit 122 can initiate power shutdown operations after having been alerted through components of the memory controller 124 that all modified data in the first memory 104 has been flushed to the second memory 106 to be made persistent. With the described embodiments, power consumption is minimized because the flushing is performed by RAS controller 136, $206_i$ hardware and logic in the memory controller 124, which consumes less battery 114 power than if the processor cores 120 had to perform the read operations from the first memory 104 to flush the data to the persistent second memory 106. Further, by implementing the flushing operations within the memory controller 124 logic and firmware, no additional hardware devices are needed to offload the flushing from the processor cores 120 because the RAS controllers 136, 206$_i$ may use the same components that perform refresh and error correction operations to perform the flushing operations, so no additional hardware is needed that could consume further power. In this way the described embodiments conserve power and processing by offloading the flushing of modified data to persistent storage to already existing components in the memory controller 124 that read the first memory 104, such as the RAS controllers 136, 206$_i$ or other components in the system 100. Although the flushing was described as performed by RAS controllers, in alternative embodiments, other components in the memory controller 124 or integrated memory controller 134, 200 may perform the flushing operations descried with respect to the RAS controllers 136, 206$_i$.

It should be appreciated that reference throughout this specification to "one embodiment" or "an embodiment" means that a particular feature, structure or characteristic described in connection with the embodiment is included in at least one embodiment of the present invention. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the invention.

Similarly, it should be appreciated that in the foregoing description of embodiments of the invention, various features are sometimes grouped together in a single embodiment, figure, or description thereof for the purpose of streamlining the disclosure aiding in the understanding of one or more of the various inventive aspects. This method of disclosure, however, is not to be interpreted as reflecting an intention that the claimed subject matter requires more features than are expressly recited in each claim. Rather, as the following claims reflect, inventive aspects lie in less than all features of a single foregoing disclosed embodiment. Thus, the claims following the detailed description are hereby expressly incorporated into this detailed description.

The reference characters used herein, such as i and n, are used herein to denote a variable number of instances of an element, which may represent the same or different values, and may represent the same or different value when used with different or the same elements in different described instances.

EXAMPLES

The following examples pertain to further embodiments.

Example 1 is an apparatus in communication with a first memory, a second memory, a processor, and a power control unit for flushing modified data from a volatile first memory to a persistent second memory, comprising: a first memory controller coupled to the first memory and including at least one Reliability, Availability, and Serviceability (RAS) controller, wherein each RAS controller reads a range of addresses in the first memory; and a second memory controller coupled to the second memory comprising a non-volatile memory; wherein the first memory controller and the second memory controller operate to: in response to the first memory controller receiving a command from the power control unit, invoke the at least one RAS controller to read data from at least one range of addresses specified for the RAS controller from the first memory; determine, by the second memory controller, whether the data read from the first memory comprises modified data; transfer, by the second memory controller, the data read from the first memory determined to be modified to the second memory; and send, by the first memory controller, a signal to the power control unit to indicate that the modified data in the range of addresses specified for the RAS controller was flushed to the second memory in response to the RAS controller completing reading data in the range of addresses.

In Example 2, the subject matter of examples 1 and 3-10 can optionally include that the second memory controller is further to discard the data read from the first memory by the RAS controller that does not comprise modified data without transferring to the second memory.

In Example 3, the subject matter of examples 1, 2 and 4-10 can optionally include being coupled to a battery, wherein the battery supplies power to the first memory controller and the second memory controller while the at least one RAS controller reads data from the range of addresses until the RAS controller has read all the data from the range of addresses and the second memory controller has transferred modified data read by the at least one RAS controller to the second memory.

In Example 4, the subject matter of examples 1-3 and 5-10 can optionally include that the first memory is comprised of a plurality of memory dies, wherein the at least one RAS controller comprises a plurality of RAS controllers each associated with a range of addresses in at least one memory channel to at least one of the memory dies, wherein each of the RAS controllers receives the command and in response reads data at the range of addresses of the RAS controller, and wherein each of the RAS controllers sends a signal to notify the power control unit that the modified data in the range of addresses for the RAS controller was flushed in response to reading data in all of the range of addresses.

In Example 5, the subject matter of examples 1-4 and 6-10 can optionally include that the at least one RAS controller is configured with the range of addresses specified for the RAS controller from initialization firmware during initialization.

In Example 6, the subject matter of examples 1-5 and 7-10 can optionally include that in response to the command, the first memory controller drains all pending write data to the first memory, and wherein the at least one RAS controller reads data from the range of addresses in response to the first memory controller draining all pending write data to the first memory.

In Example 7, the subject matter of examples 1-6 and 8-10 can optionally include that the power control unit initiates a power down operation for the processor in response to receiving a signal from each of the at least one RAS controller indicating that any modified data at the range of addresses specified for the RAS controller was read.

In Example 8, the subject matter of examples 1-7 and 9-10 can optionally include that the at least one RAS controller is further to: operate in a normal operation mode, prior to receiving the command from the power control unit, to continuously read data at each of the at least one range of addresses specified for the RAS controller to perform error correction on the read data and write back to the first memory; and terminate the normal operation mode for the command.

In Example 9, the subject matter of examples 1-8 and 10 can optionally include that the first memory provides a cache to the second memory, wherein during a normal operation mode, the second memory controller receives direct memory requests to requested data in the second memory and determines whether the requested data is cached in the first memory, wherein read requested data in the first memory is returned from the first memory and wherein in response to a write request, write data is written to the first memory.

In Example 10, the subject matter of examples 1-9 can optionally include that the first memory comprises a dynamic random access memory (DRAM) and wherein the second memory comprises a non-volatile memory device.

Example 11 is a system for flushing modified data from a volatile first memory to a persistent second memory, comprising: a processor; a first memory; a second memory comprising a non-volatile memory; a first memory controller coupled to the first memory and including at least one RAS controller, wherein each RAS controller reads a range of addresses in the first memory; a second memory controller coupled to the second memory; and a power control unit to supply power to the processor, the first memory, the second memory, the first memory controller, and the second memory controller, wherein the first memory controller and the second memory controller operate to: in response to the first memory controller receiving a command from the power control unit, invoke the at least one RAS controller to read data from at least one range of addresses specified for the RAS controller from the first memory; determine, by the second memory controller, whether the data read from the first memory comprises modified data; transfer, by the second memory controller, the data read from the first memory determined to be modified to the second memory; and send, by the first memory controller, a signal to the power control unit to indicate that the modified data in the range of addresses specified for the RAS controller was flushed to the second memory in response to the RAS controller completing reading data in the range of addresses.

In Example 12, the subject matter of examples 11 and 13-18 can optionally include a battery to supply power to the first memory controller and the second memory controller while the at least one RAS controller reads data from the range of addresses until the RAS controller has read all the data from the range of addresses and the second memory controller has transferred modified data read by the at least one RAS controller to the second memory.

In Example 13, the subject matter of examples 11, 12 and 14-18 can optionally include that the first memory is comprised of a plurality of memory dies, wherein the at least one RAS controller comprises a plurality of RAS controllers each associated with a range of addresses in at least one memory channel to at least one of the memory dies, wherein each of the RAS controllers receives the command and in response reads data at the range of addresses of the RAS controller, and wherein each of the RAS controllers sends a signal to notify the power control unit that the modified data in the range of addresses for the RAS controller was flushed in response to reading data in all of the range of addresses.

In Example 14, the subject matter of examples 11-13 and 15-18 can optionally include initialization firmware to configure the at least one RAS controller with the range of addresses specified for the RAS controller from during system initialization.

In Example 15, the subject matter of examples 11-14 and 16-18 can optionally include that in response to the command, the first memory controller drains all pending write data to the first memory, and wherein the at least one RAS controller reads data from the range of addresses in response to the first memory controller draining all pending write data to the first memory.

In Example 16, the subject matter of examples 11-15 and 17-18 can optionally include that the power control unit initiates a power down operation for the processor in response to receiving a signal from each of the at least one RAS controller indicating that any modified data at the range of addresses specified for the RAS controller was read.

In Example 17, the subject matter of examples 11-16 and 18 can optionally include that the at least one RAS controller is further to: operate in a normal operation mode, prior to receiving the command from the power control unit, to continuously read data at each of the at least one range of addresses specified for the RAS controller to perform error correction on the read data and write back to the first memory; and terminate the normal operation mode for the command.

In Example 18, the subject matter of examples 11-17 can optionally include that the first memory provides a cache to the second memory, wherein during a normal operation mode, the second memory controller receives direct memory requests to requested data in the second memory and determines whether the requested data is cached in the first memory, wherein read requested data in the first memory is returned from the first memory and wherein in response to a write request, write data is written to the first memory.

Example 19 is a method for flushing modified data from a first memory to a persistent second memory comprising a non-volatile memory, comprising: in response to a first memory controller receiving a command from a power control unit, invoking at least one RAS controller to read data from at least one range of addresses specified for the RAS controller from the first memory; determining whether the data read from the first memory comprises modified data; transferring the data read from the first memory determined to be modified to the second memory; and sending a signal to the power control unit to indicate that the modified data in the range of addresses specified for the RAS controller was flushed to the second memory in response to the RAS controller completing reading data in the range of addresses.

In Example 20, the subject matter of examples 19 and 21-25 can optionally include supplying power to a first memory controller including the at least one RAS controller and a second memory controller while the at least one RAS controller reads data from the range of addresses until the RAS controller has read all the data from the range of addresses and the second memory controller has transferred modified data read by the at least one RAS controller to the second memory.

In Example 21, the subject matter of examples 19, 20 and 22-25 can optionally include that the first memory is comprised of a plurality of memory dies, wherein the at least one RAS controller comprises a plurality of RAS controllers each associated with a range of addresses in at least one memory channel to at least one of the memory dies, wherein each of the RAS controllers receives the command and in response reads data at the range of addresses of the RAS controller, and wherein each of the RAS controllers sends a signal to notify the power control unit that the modified data in the range of addresses for the RAS controller was flushed in response to reading data in all of the range of addresses.

In Example 22, the subject matter of examples 19-21 and 23-25 can optionally include in response to the command, draining all pending write data to the first memory; and reading, by the at least one RAS controller, data from the range of addresses in response to the draining all pending write data to the first memory.

In Example 23, the subject matter of examples 19-22 and 24-25 can optionally include initiating, by the power control unit, a power down operation in response to receiving a signal from each of the at least one RAS controller indicating that any modified data at the range of addresses specified for the RAS controller was read.

In Example 24, the subject matter of examples 19-23 and 25 can optionally include operating, by the at least one RAS controller, in a normal operation mode, prior to receiving the command from the power control unit, to continuously read data at each of the at least one range of addresses specified for the RAS controller to perform error correction on the read data and write back to the first memory; and terminating the normal operation mode for the command.

In Example 25, the subject matter of examples 19-24 can optionally include that the first memory provides a cache to the second memory, further comprising: during a normal operation mode, receiving direct memory requests to requested data in the second memory; determining whether the requested data is cached in the first memory; returning read requested data in the first memory when the requested data is cached in the first memory; and in response to a write request, writing write data to the first memory.

Example 26 is an apparatus for flushing modified data from a first memory to a persistent second memory comprising a non-volatile memory, comprising: means for in response to a first memory controller receiving a command from a power control unit, invoking at least one RAS controller to read data from at least one range of addresses specified for the RAS controller from the first memory; means for determining whether the data read from the first memory comprises modified data; means for transferring the data read from the first memory determined to be modified to the second memory; and means for sending a signal to the power control unit to indicate that the modified data in the range of addresses specified for the RAS controller was flushed to the second memory in response to the RAS controller completing reading data in the range of addresses.

Example 27 is a machine-readable storage including machine-readable instructions, when executed, to implement a method or realize an apparatus as claimed in any preceding claim.

Example 28 is an apparatus comprising means to perform a method as claimed in any preceding claim.

What is claimed:

1. An apparatus adapted to communicate with a first memory, a second memory, and a power control unit in a system, comprising:
   a memory controller comprising:
      at least one interface to the first memory, the second memory, and the power control unit, wherein the power control unit manages power related and shut down operations in the system and is separate from the memory controller, wherein the power control unit communicates with the memory controller over the at least one interface and includes registers indicating addresses in the first memory that are flushed; and
      logic to:
         in response to receiving a command via the at least one interface from the power control unit, read data from the first memory;
         send the read data to store in the second memory in response to the read data comprising modified data; and
         send a signal to the power control unit to cause the power control unit to indicate in the registers the addresses that were flushed and to initiate power down operations in response to the registers indicating flushing of the sent read data to the second memory.

2. The apparatus of claim 1, wherein the logic comprises a plurality of memory channel controllers, wherein each of the memory channel controllers is assigned a region of the first memory, wherein to read data from the first memory comprises:
   send commands to the memory channel controllers to cause the memory channel controllers to read data from addresses in their assigned regions and send to store in the second memory.

3. The apparatus of claim 2, further comprising:
   a buffer,
   wherein the logic is further to:
      drain any pending writes in the buffer to the first memory, wherein the commands are sent to the memory channel controllers in response to draining the pending writes in the buffer to the first memory.

4. The apparatus of claim 2, wherein the commands sent to the memory channel controllers cause the memory channel controllers to cease normal operation mode and cease performing error corrections on read data.

5. The apparatus of claim 2, wherein the memory channel controllers comprise Reliability, Availability, and Serviceability (RAS) controllers.

6. The apparatus of claim 1, wherein the memory controller comprises a first memory controller, further comprising:
   a second memory controller, wherein the read data is sent to the second memory controller and the second memory controller only transfers the read data that is modified to the second memory.

7. The apparatus of claim 6 further coupled to a battery, wherein the battery supplies power to the first and second memory controllers until the second memory controller has completed transferring modified data of the read data to the second memory.

8. The apparatus of claim 1, wherein logic is further to:
   drain all pending writes in a buffer to the first memory in response to the command, wherein the data is read from the first memory in response to draining the buffer of the pending writes.

9. A system, comprising:
   a processor;
   a first memory to store data from the processor;
   a second memory comprising a non-volatile memory;
   a memory controller coupled to the first memory;
   a power control unit to supply power to the processor, the first memory, the second memory, and the memory controller, wherein the power control unit manages power related and shut down operations in the system and is separate from the memory controller, wherein the power control unit communicates with the memory controller over at least one interface and includes registers indicating addresses in the first memory that are flushed,
   wherein the memory controller is to:
      in response to receiving a command from the power control unit, read data from the first memory;
      send the read data to store in the second memory in response to the read data comprising modified data; and send a signal to the power control unit to cause the power control unit to indicate in the registers the addresses that were flushed and to initiate power down operations in response to the registers indicating flushing of the sent read data to the second memory.

10. The system of claim 9, wherein the memory controller is comprised of a plurality of memory channel controllers, wherein each of the memory channel controllers is assigned a region of the first memory, wherein to read data from the first memory comprises:
send commands to the memory channel controllers to cause the memory channel controllers to read data from addresses in their assigned regions and send to store in the second memory.

11. The system of claim 10, further comprising:
a buffer,
wherein the memory controller is further to:
drain any pending writes in the buffer to the first memory, wherein the commands are sent to the memory channel controllers in response to draining the pending writes in the buffer to the first memory.

12. The system of claim 10, wherein the commands sent to the memory channel controllers cause the memory channel controllers to cease normal operation mode and cease performing error corrections on read data.

13. The system of claim 10, wherein the memory channel controllers are part of the memory controller.

14. The system of claim 9, wherein the memory controller comprises a first memory controller, further comprising:
a second memory controller, wherein the read data is sent to the second memory controller and the second memory controller only transfers the read data that is modified to the second memory.

15. The system of claim 14, further comprising:
a battery to supply power to the first and second memory controllers until the second memory controller has completed transferring modified data of the read data to the second memory.

16. The system of claim 9, wherein the memory controller is further to:
drain all pending writes in a buffer to the first memory in response to the command, wherein the data is read from the first memory in response to draining the buffer of the pending writes.

17. A method implemented in a memory controller to manage data in a first memory and a second memory in a system, comprising:
in response to receiving a command from a power control unit, reading data from the first memory, wherein the power control unit manages power related and shut down operations in the system and is separate from the memory controller, wherein the power control unit communicates with the memory controller over at least one interface and includes registers indicating addresses in the first memory that are flushed;
sending the read data to store in the second memory in response to the read data comprising modified data; and
sending a signal to the power control unit to cause the power control unit to indicate in the registers the addresses that were flushed and to initiate power down operations in response to the registers indicating flushing of the sent read data to the second memory.

18. The method of claim 17, wherein the memory controller is comprised of a plurality of memory channel controllers, wherein each of the memory channel controllers is assigned a region of the first memory, wherein the reading data from the first memory comprises:
sending commands to the memory channel controllers to cause the memory channel controllers to read data from addresses in their assigned regions and send to store in the second memory.

19. The method of claim 18, further comprising:
drain any pending writes in a buffer to the first memory, wherein the commands are sent to the memory channel controllers in response to draining the pending writes in the buffer to the first memory.

20. The method of claim 18, wherein the commands sent to the memory channel controllers cause the memory channel controllers to cease normal operation mode and cease performing error corrections on read data.

21. The method of claim 18, wherein the memory channel controllers are part of the memory controller.

22. The method of claim 17, wherein the memory controller comprises a first memory controller, wherein the sending the read data comprising sending the read data to a second memory controller, further comprising:
transferring, by the second memory controller, only the read data that is modified to the second memory.

23. The method of claim 22, wherein a battery supplies power to the first and second memory controllers until the second memory controller has completed transferring modified data of the read data to the second memory.

24. The method of claim 17, further comprising:
draining, by the memory controller, all pending writes in a buffer to the first memory in response to the command, wherein the data is read from the first memory in response to draining the buffer of the pending writes.

* * * * *